(No Model.)

H. A. BARNARD.
Rotary Grain Separator.

No. 240,075. Patented April 12, 1881.

Witnesses:
H. C. McArthur
John C. Rogers

Inventor,
H. A. Barnard,
per J. H. Alexander
Attorney.

UNITED STATES PATENT OFFICE.

HEMAN A. BARNARD, OF MOLINE, ILLINOIS, ASSIGNOR TO THE BARNARD & LEAS MANUFACTURING COMPANY.

ROTARY GRAIN-SEPARATOR.

SPECIFICATION forming part of Letters Patent No. 240,075, dated April 12, 1881.

Application filed January 14, 1881. (No model.)

*To all whom it may concern:*

Be it known that I, HEMAN A. BARNARD, of Moline, in the county of Rock Island and State of Illinois, have invented certain new and useful Improvements in Rotary Grain-Separators; and I do hereby declare that the following is a full, clear, and exact description thereof, reference being had to the accompanying drawings, and to the letters of reference marked thereon, which form part of this specification.

This invention relates to certain improvements in that class of grain-cleaners known as "rotary separators," in which the impurities are separated from the grain by means of a revolving screen; and it has for its objects to provide a means for deflecting the grain and discharging it into the rotary screen near the head of the same at one side, in order to cause the grain to traverse the greater portion of the length of the screen, and to work off the grain and impurities as they enter, so as to leave ample room for the incoming grain and impurities, and insure the thorough separation of the grain from the cobs, dust, silk, and other impurities. These objects I attain by the mechanism illustrated in the accompanying drawings, in which—

Figure 1:
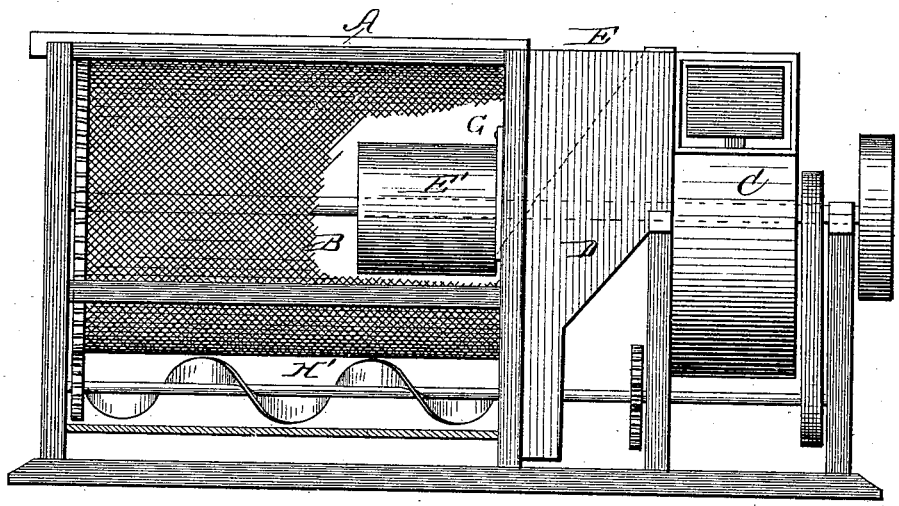
Figure 2:
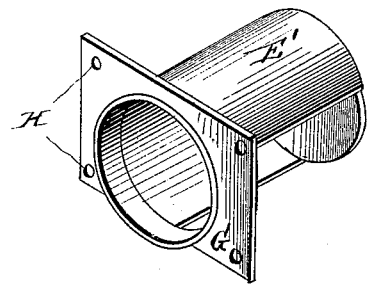

Figure 1 represents a side elevation of a separator with a portion broken away, showing my improvement. Fig. 2 represents a perspective view of a portion of my apparatus detached, and Fig. 3 a front view of the same.

The letter A indicates a suitable frame-work, containing a rotary screen, B, suction-fan C, and a separating-trunk, D. The apparatus is designed principally for separating shelled corn from the cobs and cleaning it, the shelled corn and cobs being passed into the hopper E at one end of the frame. This hopper connects with the interior of the screen at the center of its head in the usual manner, so as to deliver the grain and cobs into a cylindrical chamber at that point.

Figure 3:
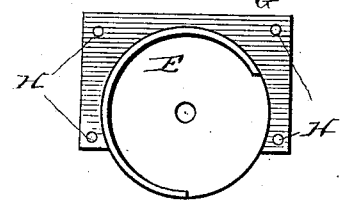

The letter E' indicates the cylindrical chamber, having one side cut away, as indicated in Figs. 2 and 3 of the drawings. The said cylinder is closed at its rear end, and at its forward end is provided with a flange, G, having suitable apertures, H, through which screws or other similar fastening devices may be passed to secure the chamber within the screen, as shown in Fig. 1. The said chamber, as indicated, when in place, is located directly in the opening at the center of the head where the grain enters from the hopper, so that the grain and cobs will be deflected out of the open side of the chamber at or about right angles to the axis of the screen, thus causing the grain and cobs to traverse a greater portion of the length of the screen, and avoiding any possibility of the grain bounding and escaping with the cobs at the open rear end of the screen, the screen by its motion causing the corn and cobs to work to the rear, in order to make room for the incoming grain and cobs. The corn passes through the perforations and the cobs out at the tail of the screen, in the usual manner, and the corn is fed or carried to the separating-trunk by means of a conveyer, H', the impurities—such as small cob ends, silks, chaff, and other light substances — being drawn up through said trunk by an exhaust, as usual, and discharged into a suitable chamber, or into the open air, the corn dropping out at the lower end of the trunk into a suitable receptacle.

Motion is given to the exhaust-fan by a suitable belt and pulley on the fan-shaft, and from the inner end of said shaft another belt and pulley revolves the conveyer.

The screen is rotated by gear-wheels from the conveyer.

Having thus fully described my invention, what I claim, and desire to secure by Letters Patent, is—

1. The combination, with a rotary screen in a grain-cleaner, of a stationary chamber within the screen, said chamber having a longitudinal opening on one side thereof, for the purpose of delivering the grain, substantially in the manner described.

2. The combination, with a rotary screen of a grain-cleaner, of a stationary chamber located within said screen, the chamber being closed at its rear end and formed with a longitudinal opening on one side, substantially as and for the purpose set forth.

3. The chamber E', constructed with a flange,

G, at its open or forward end, whereby it is adapted to be rigidly secured within a rotary grain-screen, the said chamber being closed at its rear end by a circular disk, and having a longitudinal opening at one side, the lower edge of the disk forming a guard to cause the grain to be discharged into the screen at one side, substantially as and for the purposes set forth.

In testimony that I claim the foregoing as my own I affix my signature in presence of two witnesses.

HEMAN A. BARNARD.

Witnesses:
J. SILAS LEAS,
J. S. GILLMORE.